F. M. ARNOLD.
SPRING WHEEL MOUNTING.
APPLICATION FILED MAY 31, 1916.
1,214,743.
Patented Feb. 6, 1917.
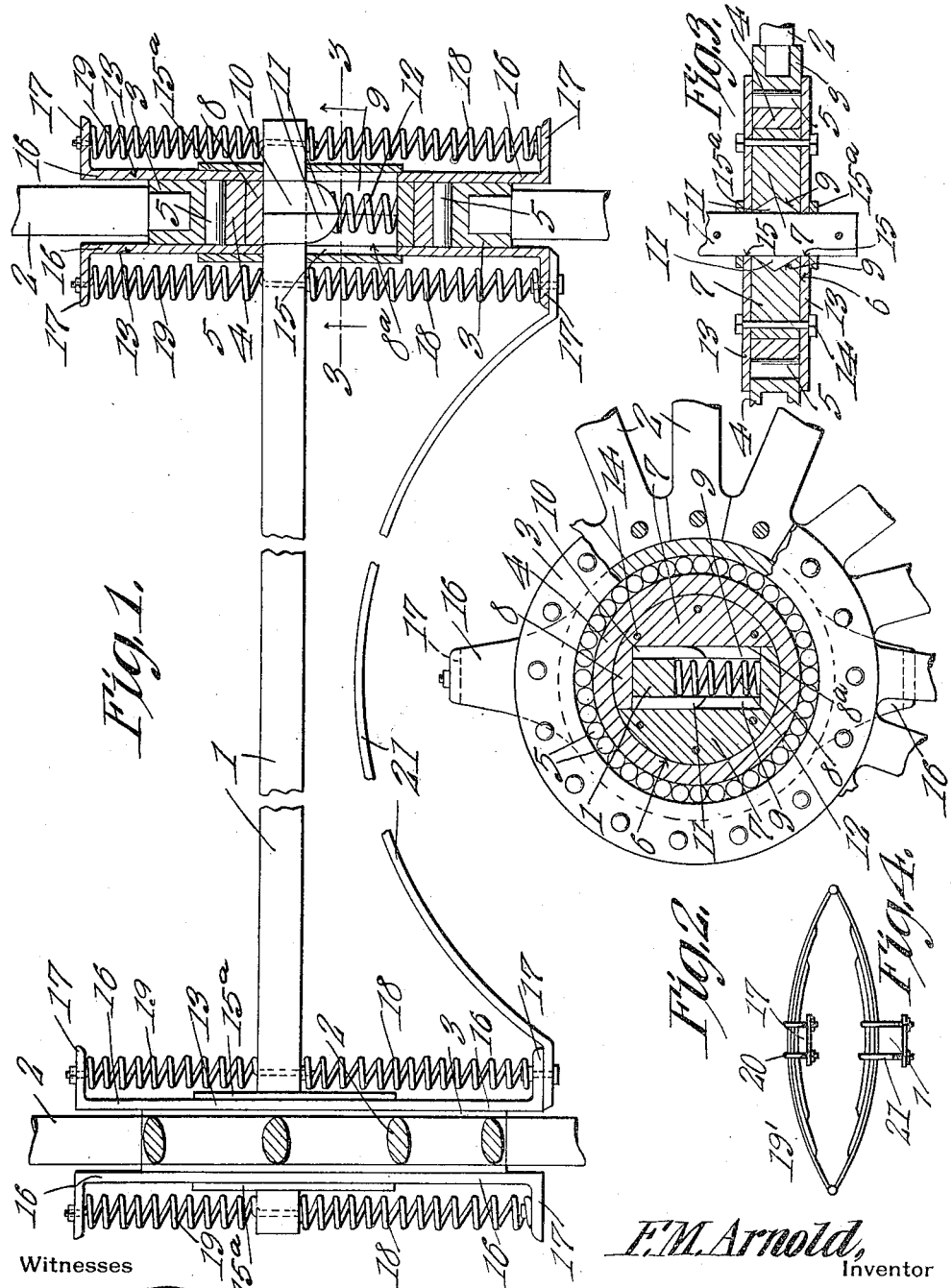
F. M. Arnold,
Inventor
Witnesses

UNITED STATES PATENT OFFICE.

FRANK M. ARNOLD, OF GRAND RAPIDS, OHIO.

SPRING-WHEEL MOUNTING.

1,214,743.   Specification of Letters Patent.   Patented Feb. 6, 1917.

Application filed May 31, 1916. Serial No. 100,867.

*To all whom it may concern:*

Be it known that I, FRANK M. ARNOLD, a citizen of the United States, residing at Grand Rapids, in the county of Wood and State of Ohio, have invented a new and useful Spring-Wheel Mounting, of which the following is a specification.

The present invention appertains to spring wheel mountings, and aims to provide novel and improved means for assembling the wheels of an automobile or other vehicle with the axle, whereby the axle and wheels can yield relatively to one another, to absorb shocks, and to provide for the easy running of the vehicle on rough roads, without as well as with the use of pneumatic tires.

It is also the object of the invention to provide a resilient wheel mounting which is comparatively simple and inexpensive in construction, and which will serve its office in a thoroughly practical and efficient manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is an elevation illustrating a vehicle axle and the hub portions of two wheels showing the invention applied thereto, portions being broken away and others being shown in section. Fig. 2 is a sectional view of the mounting of one wheel, portions being shown in elevation, and others being broken away. Fig. 3 is a sectional detail taken on the line 3—3 of Fig. 1. Fig. 4 is a detail view illustrating a modification.

In the drawing, the numeral 1 designates the axle of an automobile or other vehicle, upon the terminals of which are mounted the wheels embodying the spokes 2 and annular hubs 3 of U-shaped section in which the inner ends of the spokes 2 are secured in any suitable manner.

Disposed within each hub 3 is a ring 4, and an annular series of anti-frictional rollers 5 is disposed between the hub 3 and ring 4 to enable the hub to rotate freely with respect to the stationary or non-rotatable ring 4. Fitted snugly within the ring 4 is a disk or circular member 6 composed of vertical segmental-shaped sections 7, one provided at its upper end and the other provided at its lower end with an extension 8 projecting at right angles therefrom to the corresponding end of the opposite section. There is a vertical slot $8^a$ between the sections 7 the ends of which are defined by the extensions 8. The adjacent sides or edges of the sections 7 have vertical V-shaped grooves 9 in which are slidable the V-shaped lugs 10 of the axle 1. This axle 1 has its terminals extending through the slots $8^a$, and the axle is provided upon its front and rear sides with the lugs 10 adjacent its ends, whereby the axle 1 and hub structures are guided for vertical movements relative to one another. The lugs 10 have depending extensions 11 working within the grooves 9, whereby to hold the wheels in planes at right angles with the axle 1.

Disposed between the axle 1 and the lower extensions 8 defining the lower ends of the slots $8^a$ are coiled wire expansion springs 12, which move the disks 6 and wheels downwardly relative to the axle, or which yieldably raise the axle to the upper ends of the slots $8^a$. The springs 12 are disposed between the extensions 11.

Resting against the opposite sides of each disk 6 is a pair of plates 13 which are secured to said disk by means of bolts 14 or other securing elements engaged through said disks and plates. Thus, the plates 13 and sections 7 are secured together, and the plates 13 overlap the ring 4, and hub 3 to hold said parts in position, and to also hold the rollers 5 in place. The plates 13 have vertical slots 15 registering or coinciding with the slots $8^a$, so that the axle 1 projects through and works vertically in the slots 15 and $8^a$, and vertical plates $15^a$ are mounted upon the axle 1 and overlap the outer sides of the plates 13 to close the slots 15 at all positions of the axle and disk 6 relative to one another, so as to exclude dust, dirt and extraneous matter.

The plates 13 are provided with upwardly and downwardly projecting brackets 16 having the ends 17 extending at right angles therefrom, away from the wheels, and coiled wire expansion springs 18 are disposed between the axle 1 and ends 17 of the lower brackets 16, while coiled wire retractile springs 19 connect the ends 17 of the upper brackets 16 and the axle 1. The springs 18 and 19 assist the springs 12 in yieldably supporting the axle 1 from the wheels, or to yieldably depress the wheels relative to the axle, whereby the desired resiliency is provided. The springs 18 and 19 of each wheel are disposed upon the outer and inner sides thereof to provide a balanced spring action. As a means for steadying the brackets, an arched tie or stay member 21 can have its ends bolted or otherwise attached to the ends 17 of the lower brackets 16 upon the inner sides of the wheels, and if desired, a similar tie or stay member can connect the upper inner brackets.

When one of the wheels passes over an obstruction, it can move vertically relative to the axle, to absorb the shock, and to prevent an unnecessary jar to the occupants of the vehicle. Thus, when one wheel moves upwardly relative to the axle, the disk 6 is moved upwardly with the hub 3, thereby compressing the spring 12, and the plates 13 and their brackets are also moved upwardly, thus compressing the springs 18 and elongating the springs 19. As soon as the wheel has passed the obstruction, it will return to normal position under the influence of the springs. The wheel moves in a vertical plane, and the axle 1 can yield or move downwardly, as when both wheels pass over an obstruction.

The several parts can be readily assembled, and are easily separated for purpose of cleaning, repair, or replacement. The slots 8ᵃ and 15 can either be arranged vertically, or in an inclined position. When the slots are inclined rearwardly, they lie on lines along which the resultant forces act when the wheels of a moving vehicle strike an obstruction, since there is a force acting upward, and another acting rearward, while the component of these forces act upwardly and inwardly in an inclined direction. Thus, by providing the slots in an inclined position, the wheels and axle can yield relative to one another easier than if the slots are vertical.

In the structure illustrated in Fig. 4, an elliptical spring 19′ is used, the lower half thereof being clamped by a clamp 21 upon the axle 1, and the upper half of the spring being clamped upon the terminal 17 of the upper bracket by a clamp 20. The shorter leaves of the two halves of the spring are disposed upon the inner sides of the longer leaves which have their terminals pivotally connected, whereby the spring 19′ is of the expansion type instead of the compression type of elliptical spring. The springs 19′ can be provided at both sides of the wheels, and when these springs are used, it is preferable to omit the springs below the axle.

Having thus described the invention, what is claimed as new is:

1. In a device of the character described, a member having a vertical slot, a wheel hub rotatable upon said member, plates secured to the opposite sides of said member and overlapping said hub, said plates having vertical slots registering with the aforesaid slot, an axle projecting through said slots, said plates having brackets, and springs between said brackets and axle for yieldably moving said member downwardly relative to the axle.

2. In a device of the character described, a disk composed of segmental-shaped sections having a slot therebetween and grooves in their adjacent edges, a ring in which said disk is fitted, a wheel hub rotatable upon said ring, plates resting against the opposite sides of said disk and overlapping said ring and hub to hold them in relative position, said plates having vertical slots registering with the aforesaid slot, an axle projecting through said slots and having lugs working in said grooves, securing means engaging through said plates and sections of said disk, said plates having brackets, and springs between said brackets and axle for yieldably moving said disk downward relative to the axle.

In testimony that I claim the foregoing as my own, I have hereto affixed my signature in the presence of two witnesses.

FRANK M. ARNOLD.

Witnesses:
 GEO. A. BELL,
 MYRTLE D. BELL.

Copies of this patent may be obtained for five cents each, by addressing the "Commissioner of Patents, Washington, D. C."